(12) United States Patent
Reimann

(10) Patent No.: US 9,513,608 B2
(45) Date of Patent: Dec. 6, 2016

(54) DEVICE AND METHOD FOR OPERATING AN ELECTROMECHANICAL ADJUSTMENT DEVICE

(71) Applicant: Johnson Controls Metals and Mechanisms GmbH & Co. KG, Solingen (DE)

(72) Inventor: Michael Reimann, Düsseldorf (DE)

(73) Assignee: Johnson Controls Metals & Mechanisms GmbH & Co. KG, Solingen (DE)

( * ) Notice: Subject to any disclaimer, the term of this patent is extended or adjusted under 35 U.S.C. 154(b) by 63 days.

(21) Appl. No.: 14/403,931

(22) PCT Filed: Apr. 5, 2013

(86) PCT No.: PCT/EP2013/057183
§ 371 (c)(1),
(2) Date: Nov. 25, 2014

(87) PCT Pub. No.: WO2013/178388
PCT Pub. Date: Dec. 5, 2013

(65) Prior Publication Data
US 2015/0102755 A1      Apr. 16, 2015

(30) Foreign Application Priority Data
May 30, 2012   (DE) .................. 10 2012 209 073

(51) Int. Cl.
*G05D 3/12*       (2006.01)
*G05B 11/01*      (2006.01)
*H02H 7/085*      (2006.01)

(52) U.S. Cl.
CPC ............ *G05B 11/01* (2013.01); *H02H 7/0851* (2013.01)

(58) Field of Classification Search
CPC .............................. G05B 11/01; H02H 7/0851
(Continued)

(56) References Cited

U.S. PATENT DOCUMENTS 3,870,936 A * 3/1975 Coberley .............. B41F 13/025
101/248
3,873,902 A * 3/1975 Burch .................. B65G 1/0421
187/291

(Continued)

FOREIGN PATENT DOCUMENTS

DE    1020050 60 325 A1    6/2007
DE    2020060 02 525 U1    8/2007
(Continued)

OTHER PUBLICATIONS

International Search Report in PCT/EP2013/057183, 5 pages.
(Continued)

*Primary Examiner* — Rita Leykin
(74) *Attorney, Agent, or Firm* — Foley & Lardner LLP

(57) ABSTRACT

A device and a method for operating an electromechanical adjustment device having an electric drive device, include a control unit that detects the reaching of a mechanical end stop of the adjustment device and controls and/or regulates the electric drive device. After a mechanical end stop of the adjustment device is reached, a change in the direction of rotation is automatically actuated in the electric drive device for a predefinable period of time or a predefinable traveling distance.

10 Claims, 1 Drawing Sheet

(58) Field of Classification Search
USPC .... 701/70, 49; 318/266, 293, 434, 265, 602, 318/606, 400.38, 468, 466, 286, 369
See application file for complete search history.

(56) References Cited

U.S. PATENT DOCUMENTS

| | | | | |
|---|---|---|---|---|
| 4,552,065 | A * | 11/1985 | Billington | B41J 13/32 |
| | | | | 101/233 |
| 4,678,912 | A * | 7/1987 | Horrocks | G01T 7/08 |
| | | | | 250/328 |
| 4,713,593 | A * | 12/1987 | Rodi | B41F 31/045 |
| | | | | 101/365 |
| 4,855,776 | A * | 8/1989 | Akashi | G02B 7/34 |
| | | | | 396/111 |
| 5,260,632 | A * | 11/1993 | Schalz | G05D 3/10 |
| | | | | 318/280 |
| 5,578,912 | A * | 11/1996 | Mizuta | B60J 7/0573 |
| | | | | 318/266 |
| 5,678,673 | A * | 10/1997 | Borschert | F16D 28/00 |
| | | | | 192/109 R |
| 5,714,854 | A * | 2/1998 | Mizuta | B60J 7/0573 |
| | | | | 318/266 |
| 5,723,959 | A | 3/1998 | Iwata et al. | |
| 6,297,609 | B1 * | 10/2001 | Takahashi | H02H 7/0851 |
| | | | | 318/283 |
| 6,969,127 | B2 * | 11/2005 | Suzuki | B60T 13/741 |
| | | | | 303/122 |
| 7,005,815 | B2 * | 2/2006 | Takeuchi | G05B 19/231 |
| | | | | 318/265 |
| 7,239,097 | B2 * | 7/2007 | Hashimoto | H02P 4/00 |
| | | | | 318/400.08 |
| 7,977,902 | B2 | 7/2011 | Batejat et al. | |
| 7,980,214 | B2 * | 7/2011 | Inoue | F01L 1/352 |
| | | | | 123/90.15 |
| 8,296,029 | B2 * | 10/2012 | Watanabe | B60T 13/662 |
| | | | | 188/265 |
| 8,552,715 | B2 * | 10/2013 | Semineth | G01D 5/2451 |
| | | | | 324/207.25 |
| 2009/0240401 | A1 * | 9/2009 | Rosch | H02H 7/0851 |
| | | | | 701/49 |

FOREIGN PATENT DOCUMENTS

| | | |
|---|---|---|
| DE | 102006036681 A1 | 2/2008 |
| DE | 102009008366 B3 | 8/2010 |
| EP | 0 905 592 A1 | 3/1999 |
| JP | 11-089268 A1 | 3/1999 |
| JP | 2005-039958 A | 2/2005 |
| WO | WO-2011/012376 A1 | 2/2011 |

OTHER PUBLICATIONS

Office Action dated Apr. 11, 2013, in German priority application No. 10 2012 209 073.8, 5 pages.

Office Action dated Dec. 8, 2015, in corresponding Japanese application No. 2015-513056, 4 pages.

Office Action dated May 11, 2016 in corresponding Korean Application No. 10-2014-7037019 and English translation, 11 pages.

* cited by examiner

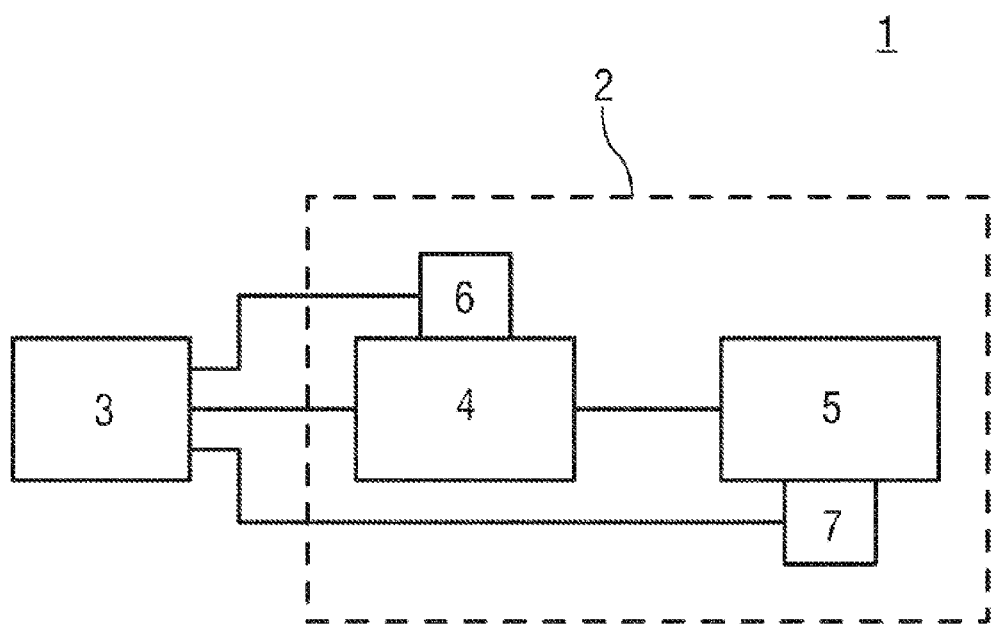

DEVICE AND METHOD FOR OPERATING AN ELECTROMECHANICAL ADJUSTMENT DEVICE

CROSS REFERENCE TO RELATED APPLICATIONS

The present application is a U.S. National Stage of International Application No. PCT/EP2013/057183 filed on Apr. 5, 2013, which claims the benefit of German Patent Application No. 10 2012 209 073.8 filed on May 30, 2012, the entire disclosures of all of which are incorporated herein by reference.

The invention relates to a device and a method for operating an electromechanical adjustment device in accordance with the preamble of claim 1 and claim 5 respectively.

Conventional electromechanical adjustment drives must be designed in a mechanical manner so as to prevent a mechanical jamming once the adjustment drive arrives at the mechanical end stop and the electric drive switches off so that the electric drive can subsequently be moved back in the opposite direction out of the stop position without any problem. A state of stiffness or immovability that results from the moving components being stressed against one another and the sticking friction is described as a mechanical jamming of the electromechanical adjustment drive. If the magnitude of these stresses and the sticking friction exceeds the drive output of the electric drive, it is no longer possible to move the electric drive out of the mechanical end stop.

DE 20 2006 002 525 U1 describes a jamming protection for an adjustment device, in particular a seat adjustment device of a motor vehicle, having a motorized drive and a control unit that is embodied in such a manner that in order to monitor a jamming event at least the movement classifications: a) the adjustment device is stiff, b) an object is jammed, c) the adjustment device is in contact with the end stop, and d) a sudden counter reaction are identified, wherein a decision criterion is derived from the ascertained characteristic variables of the motorized drive and this decision criterion is used to assign the prevailing state of the adjustment device to one of the movement classifications.

The object of the present invention is to provide a device that is improved with respect to the prior art and to provide an improved method for operating an electromechanical adjustment device.

With respect to the device and the method for operating an electromechanical adjustment device, the object is achieved by virtue of the features that are disclosed in claim 1 and claim 5 respectively.

Advantageous further developments of the invention are the subject matter of the subordinate claims.

In the case of the device for operating an electromechanical adjustment device having an electric motorized drive device, wherein a control unit is provided to control the electric motorized drive device in an open loop and/or closed loop manner, in accordance with the invention once the adjustment device arrives at the mechanical end stop, the direction of rotation at the electric motorized drive device can be reversed automatically by means of the control unit for a predetermined period of time or for a predetermined travel distance. As a consequence, the adjustment device moves out of the region of the mechanical end stop and comes to a standstill in a state in which it is free of mechanical stresses. Consequently, the electromechanical adjustment device is reliably prevented from mechanically jamming and it is easier to start the electric motorized drive device later.

The control unit expediently comprises means to ascertain that the electric motorized drive device has come to a standstill. As a consequence, it is possible to reliably ascertain that the electric motorized drive device has come to a standstill.

In an advantageous embodiment, a current sensor that measures the motor current is provided as a means to ascertain that the electric motorized drive device has come to a standstill. If it is detected that a predetermined threshold value of the engine current has been exceeded, it is ascertained that the electric motorized drive device has come to a standstill and the information is passed to the control unit. A motor current measurement of this type renders it possible to ascertain without additional sensor technology that the electric motorized drive device has come to a standstill.

In a further advantageous embodiment, a sensor arrangement comprising a Hall sensor that is fixed to the stator and a transmitter wheel that is fixed to the rotor is arranged on the electric motorized drive device as a means to ascertain that the electric motorized drive device has come to a standstill. An absence of the sensor signals of the sensor arrangement is ascertained as an indication that the electric motorized drive device has come to a standstill. A sensor arrangement of this type renders it possible to ascertain the travel distance of the electromechanical adjustment device in addition to reliably ascertaining that the electric motorized drive device has come to a standstill.

In a further advantageous embodiment, the electric motorized drive device is supplied with an electrical voltage of a reverse polarity to reverse the direction of rotation or a rotating field is reversed. In this manner, it is rendered possible to perform a simple and rapid reversal of the direction of rotation of an electric motorized drive device that is embodied as a direct current motor comprising brushes.

In an advantageous embodiment, the predetermined travel distance of the electric motorized drive device is ascertained by means of a travel sensor.

In a particularly preferred embodiment, during the operation of the electric motorized drive device it is monitored or ascertained at predetermined time intervals by means of the control device that the electric motorized drive device has come to a standstill. In this manner an immediate reversal of the direction of rotation can be initiated in the case of ascertaining that the electric motorized drive device has come to a standstill. The individual components of the electromechanical adjustment device move relative to one another and the affected sliding zones are in a sliding friction state. Consequently, a mechanical jamming event in the region of the mechanical end stop is reliably prevented since a mechanical jamming event of this type only occurs in the case of the electric motorized drive device coming to a standstill and the resultant sticking friction.

The invention is further explained with reference to the attached schematic FIGURE.

In the drawing:

FIG. 1 illustrates schematically a block diagram of a device for operating an electromechanical adjustment device having an electric motorized drive device and a control unit.

FIG. 1 illustrates schematically a block diagram of a device 1 for operating an electromechanical adjustment device 2. The device 1 comprises a control unit 3.

The electromechanical adjustment device 2 is embodied as a conventional electromechanical adjustment device and comprises an electric motorized drive device 4 and a mechanical actuating assembly 5 that are mechanically coupled and preferably arranged jointly in a housing (not illustrated in more detail) and in this manner form a structural unit that can be easily assembled.

By way of example, the electric motorized drive device can be embodied as a conventional direct current motor.

The mechanical actuating assembly 5 can be embodied as a gear, a combination of multiple gears, a pivoting lever or the like.

The control unit 3 is embodied as a conventional electronic control unit and controls the electric motorized drive device 4 by means of conventional relay contacts or a conventional semiconductor bridge circuit.

A semiconductor bridge circuit is integrated into the control unit 3 and can be embodied from individual power transistors, in particular metal oxide semiconductor field effect transistors, or in the form of an entirely integrated motor end stage.

The number of components of the control unit 3 is significantly reduced by means of an entirely integrated motor end stage of this type.

The control unit 3 is preferably arranged on the electromechanical adjustment device 2 or integrated into its housing.

The control unit 3 comprises means to ascertain that the electric motorized drive device 4 has come to a standstill.

In a first embodiment, a conventional motor current measurement is performed as a means to ascertain that the electric motorized drive device 4 has come to a standstill.

A motor current measurement is performed in a first embodiment with reference to a drop in voltage at a measuring resistor that is connected in series, said resistor is also described as a shunt.

In a second embodiment, a motor current measurement can be performed with reference to a drop in voltage at the power transistors of the semiconductor bridge circuit.

In a third embodiment, it is possible to perform a motor current measurement by means of measuring a magnetic field that surrounds a supply line of the electric motorized drive device 4, wherein a magnetic effect of the motor current that is conveyed within the supply line is ascertained.

In a first embodiment variant, if the motor current of the electric motorized drive device 4 exceeds a predetermined threshold value, the control unit 3 ascertains that the electric motorized drive device 4 has come to a standstill. The predetermined threshold value of the motor current is stored in the control unit 3 or can be set by means of said control unit. A motor current measurement of this type renders it possible without additional sensor technology to ascertain that the electric motorized drive device 4 has come to a standstill.

In an alternative embodiment variant, a motor current measurement is performed, wherein the measured value of the motor current is digitized and is evaluated in a conventional manner by means of the control unit 3.

By way of example, it is possible, based on an absence of a change in current of the motor current, such a change normally being brought about by the commutation processes of the electric motorized drive device 4, to ascertain that the electric motorized drive device 4 has come to a standstill.

It is possible to ascertain the travel distance of the electromechanical adjustment device 2 by means of counting the number of commutation processes that modulate the motor current signal.

In a further alternative embodiment, the digitized measured value of the motor current is evaluated by means of a frequency analysis and/or spectrum analysis in a conventional manner and in this manner it is ascertained that the electric motorized drive device 4 has come to a standstill.

In an alternative advantageous embodiment, a sensor arrangement 6 comprising a Hall sensor that is fixed to the stator and a transmitter wheel that is fixed to the rotor is arranged on the electric motorized drive device 4, said sensor being a means to ascertain that the electric motorized drive device 4 has come to a standstill. An absence of the sensor signals of the sensor arrangement 6 is ascertained as an indication that the electric motorized drive device 4 has come to a standstill. A sensor arrangement 6 of this type renders it possible to ascertain the travel distance of the electromechanical adjustment device 2 in addition to reliably ascertaining that the electric motorized drive device 4 has come to a standstill.

In one possible embodiment, multiple means to ascertain that the electric motorized drive device 4 has come to a standstill can be combined so that redundant possibilities to ascertain that the electric motorized drive device 4 has come to a standstill are rendered possible and in this manner the likelihood of a failure of the means to ascertain that the electric motorized drive device 4 has come to a standstill is reduced.

In an alternative embodiment that is not illustrated in detail, the sensor arrangement 6 can be formed from conventional travel or position sensors, by way of example inductive sensors.

During operation of the method, once the adjustment device 2 arrives at a mechanical end stop, a reversal of the direction of rotation at the electric motorized drive device 4 is automatically initiated for a predetermined period of time or a predetermined travel distance. As a consequence, the adjustment device 2 moves out of the region of the mechanical end stop and comes to a standstill in a state in which it is free from mechanical stresses. Consequently, the electromechanical adjustment device 2 is reliably prevented from mechanically jamming and it is easier to start the electric motorized drive device 4 later.

The arrival of the adjustment device at the mechanical end stop is detected by means of ascertaining that the electric motorized drive device 4 has come to a standstill.

Once the adjustment device arrives at the mechanical end stop, the electric motorized drive device 4 is supplied in dependence upon its embodiment with an electrical voltage of a reverse polarity or the rotating field is reversed in order to reverse the direction of rotation. In this manner, it is rendered possible to perform a simple and rapid reversal of the direction of rotation of an electric motorized drive device 4 that is embodied as a direct current motor that comprises brushes.

The electric motorized drive device 4 is supplied with an electrical voltage of a reverse polarity or the rotating field is reversed in a first embodiment variant for a predetermined period of time that is stored in the control unit 3 or can be set by means of said control unit.

In an alternative embodiment variant, the electric motorized drive device 4 is supplied with an electrical voltage of a reverse polarity or the rotating field is reversed for a predetermined travel distance. The predetermined travel distance is stored in the control unit 3 or can be set by means of said control unit and can be determined in a first embodiment from the signals of the sensor arrangement 6.

In an alternative embodiment, the predetermined travel distance of the electric motorized drive device 4 is ascertained by means of a separate travel sensor 7. This travel sensor 7 can be arranged on the electric motorized drive device 4 or on the mechanical actuating assembly 5.

In a particularly preferred embodiment, during the operation of the electric motorized drive device 4 it is monitored or ascertained continuously at predetermined time intervals by means of the control unit 3 that the electric motorized drive device 4 has come to a standstill. In this manner, an immediate reversal of the direction of rotation can be initiated in the case of ascertaining that the electric motorized drive device 4 has come to a standstill. The individual components of the electromechanical adjustment device 2 as a result of their inertia in relative movements with respect to one another and the affected sliding zones are in a sliding friction state. Consequently, a mechanical jamming event in the region of the mechanical end stop is reliably avoided by means of immediately reversing the direction of rotation of the electric motorized drive device 4 since a mechanical jamming event of this type only occurs in the case of the electric motorized drive device 4 and the mechanical actuating assembly 5 that is coupled to said drive device coming to a standstill and the sticking friction that results therefrom.

LIST OF REFERENCE NUMERALS

1 Device
2 Electromechanical Adjustment Device
3 Control Unit
4 Electric Motorized Drive Device
5 Mechanical Actuating Assembly
6 Sensor Arrangement
7 Travel Sensor

The invention claimed is:

1. A device for operating an electromechanical adjustment device comprising:
   an electric motorized drive device,
   wherein a control unit is provided to ascertain the arrival of the adjustment device at a region of a mechanical end stop and to control the electric motorized drive device in an open loop and/or closed loop manner,
   wherein, once the adjustment device arrives at the region of the mechanical end stop, a reversal of the direction of rotation can be automatically initiated immediately by the control unit at the electric motorized drive device for a predetermined period of time or a predetermined travel distance,
   wherein, when the reversal of the direction of rotation is initiated by the control unit, the control unit is configured to move the adjustment device out of the region of the mechanical end stop and to a standstill in a state in which the adjustment device is free of mechanical stresses.

2. The device as claimed in claim 1, wherein the control unit comprises means to ascertain that the electric motorized drive device has come to a standstill.

3. The device as claimed in claim 1, wherein a motor current sensor is provided to ascertain that the electric motorized drive device has come to a standstill.

4. The device as claimed in claim 1, wherein a sensor arrangement comprising a Hall sensor that is fixed to the stator and a transmitter wheel that is fixed to the rotor is arranged on the electric motorized drive device to ascertain that the electric motorized drive device has come to a standstill.

5. A method for operating an electromechanical adjustment device, the method comprising:
   providing an electric motorized drive device and a control unit;
   automatically initiating a reversal of the direction of rotation at the electric motorized drive device for a predetermined period of time or a predetermined travel distance once the adjustment device arrives at a region of a mechanical end stop; and
   moving the adjustment device out of the region of the mechanical end stop and to a standstill in a state in which the adjustment device is free of mechanical stresses when the reversal of the direction of rotation is initiated by the control unit.

6. The method as claimed in claim 5, wherein if a predetermined threshold value of the motor current is exceeded it is ascertained that the electric motorized drive device has come to a standstill.

7. The method as claimed in claim 5, wherein an absence of the sensor signals of the sensor arrangement is ascertained as an indication that the electric motorized drive device has come to a standstill.

8. The method as claimed in claim 5, wherein the electric motorized drive device is supplied with an electrical voltage of a reverse polarity or a reversal of the rotating field is initiated.

9. The method as claimed in claim 5, wherein the predetermined travel distance is ascertained by a travel sensor.

10. The method as claimed in claim 5, wherein during the operation of the electric motorized drive device it is monitored or ascertained at predetermined time intervals by the control unit that the electric motorized drive device has come to a standstill.

* * * * *